(12) United States Patent
Asano et al.

(10) Patent No.: US 8,325,083 B2
(45) Date of Patent: Dec. 4, 2012

(54) RADAR APPARATUS

(75) Inventors: Toshio Asano, Kawasaki (JP); Toshio Namba, Kawasaki (JP); Takashi Murano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 12/838,782

(22) Filed: Jul. 19, 2010

(65) Prior Publication Data

US 2011/0109494 A1    May 12, 2011

(30) Foreign Application Priority Data

Nov. 6, 2009    (JP) .................................. 2009-255312

(51) Int. Cl.
*G01S 13/00* (2006.01)
(52) U.S. Cl. .......................................... 342/91; 342/118
(58) Field of Classification Search .............. 342/91–97, 342/118–146
See application file for complete search history.

(56) References Cited

U.S. PATENT DOCUMENTS

| | | | |
|---|---|---|---|
| 3,659,290 A | 4/1972 | Bourque | |
| 4,562,438 A * | 12/1985 | Rouse et al. | 342/201 |
| 4,626,855 A * | 12/1986 | Rouse | 342/201 |
| 5,095,313 A | 3/1992 | Patel et al. | |
| 6,191,725 B1 | 2/2001 | Lavoie | |
| 7,541,972 B1 | 6/2009 | Dougherty et al. | |

FOREIGN PATENT DOCUMENTS

| | | |
|---|---|---|
| JP | 2007-170845 | 7/2007 |
| JP | 2008-72506 | 3/2008 |

OTHER PUBLICATIONS

Extended European Search Report issued Aug. 2, 2011, in Patent Application No. 10170095.3.
Partial European Search Report issued on Feb. 17, 2011 in the corresponding European Application No. 10170095.3.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

According to one embodiment, an radar apparatus includes a signal processor, a transmitting unit, an antenna, a first receiving unit, and a second receiving unit. The signal processor generates first or second pulses, and generates a control signal having first or second states. The transmitting unit converts the first and second pulses into first and second transmission pulses. The antenna radiates the first and second transmission pulses and receives reflection pulses to generate a reception signal. The first receiving unit includes first and second receiving circuits which processes the reception signal to generate first and second processed signals, respectively, and outputs one of the first and second processed signals depending on the state of the control signal. The second receiving unit processes the one of the first and second processed signals.

9 Claims, 4 Drawing Sheets

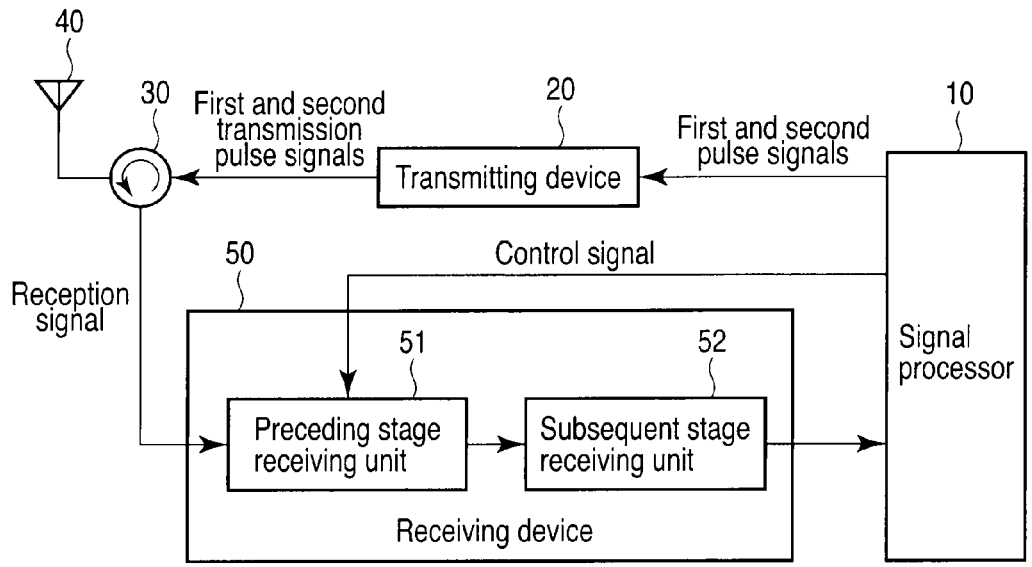
F I G. 1
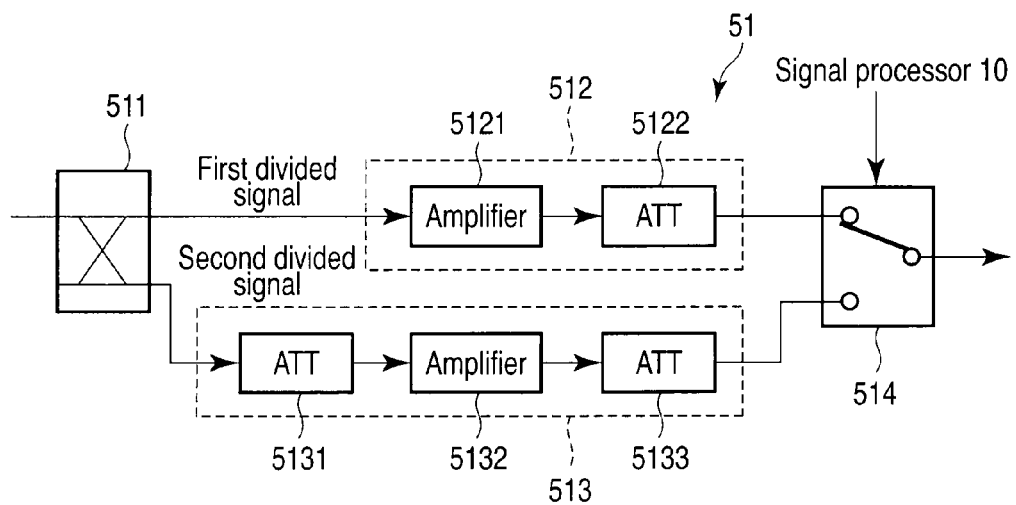
F I G. 2

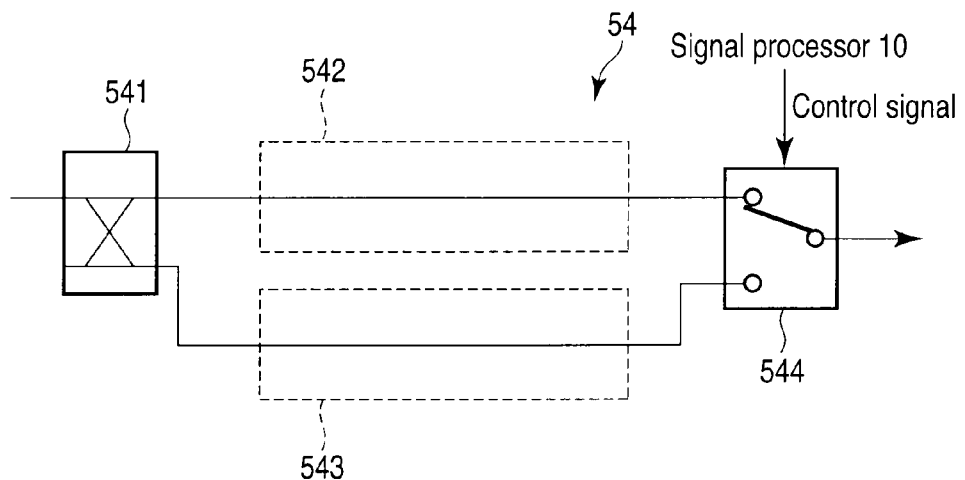
F I G. 5
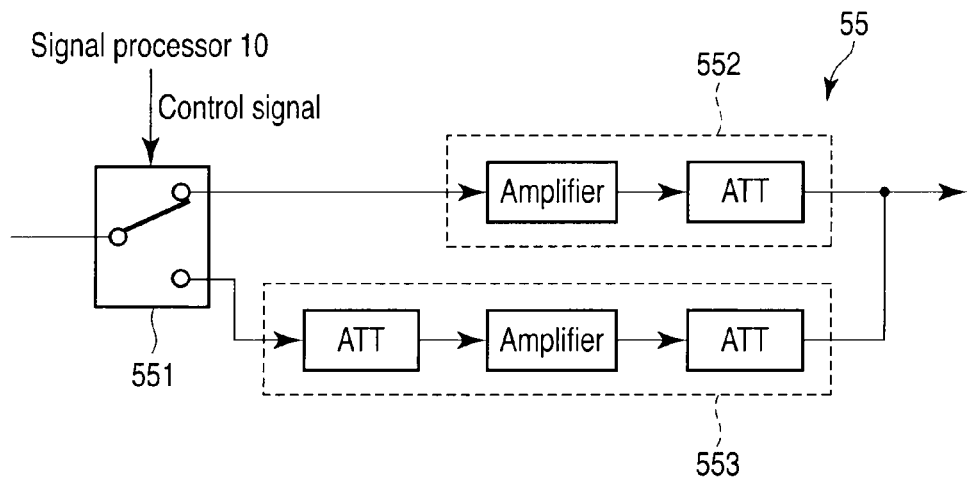
F I G. 6

RADAR APPARATUS

CROSS-REFERENCE TO RELATED APPLICATIONS

This application is based upon and claims the benefit of priority from Japanese Patent Application No. 2009-255312, filed Nov. 6, 2009; the entire contents of which are incorporated herein by reference.

FIELD

Embodiments described herein relate generally to a radar apparatus used for, for example, an airport surveillance radar.

BACKGROUND

Some radar apparatuses have a function of controlling a gain of a reception signal in accordance with their purposes. A general function of this type is STC (Sensitivity Time control). In STC, the law that the strength of an echo reflected from a target is inversely proportional to the fourth power of the distance from the target is utilized. For example, for detection of a target in a short range, a receiver sensitivity is suppressed by decreasing a gain within the bounds of not losing track of the target, and for detection of a target in a long range, the receiver sensitivity is increased by increasing the gain as the distance increases. The STC makes it possible to normally receive an echo reflected from a target in a short range, and prevent an echo reflected from a terrain, building or surface of the sea (collectively referred to as clutter) from interfering with the reception of an echo reflected from a target in a long range.

To realize the above-described STC, a radar apparatus comprising a receiving unit for short-range detection and a receiving unit for long-range detection has been proposed (see, Jpn. Pat. Appln. KOKAI Publication No. 2008-72506, for example). The radar apparatus realizes short-range detection and long-range detection by selective switching between the receiving unit for short-range detection and the receiving unit for long-range detection. However, this radar apparatus requires a plurality of receiving units, and involves a problem that costs and size of the entire radar apparatus are inevitably increased.

To realize the STC, a radar apparatus in which a gain processing path for short-range detection and a gain processing path for long-range detection are connected to a single receiver has also been proposed (see, Jpn. Pat. Appln. KOKAI Publication No. 2007-170845, for example). This radar apparatus detects, by means of a timing controller, a time when switching between a short-range detection mode and a long-range detection mode is performed, and performs switching between the gain processing path for short-range detection and the gain processing path for long-range detection at the detected time. Then, the radar apparatus processes a signal which has passed the gain processing path for short-range detection or long-range detection by means of the single receiver. However, the radar apparatus requires the timing controller which detects a time at which switching between the short-range detection mode and the long-range detection mode is performed. The timing controller is expensive, and the use of the timing controller results in higher costs of the radar apparatus.

BRIEF DESCRIPTION OF THE DRAWINGS

FIG. 1 is a block diagram showing an exemplary functional configuration of a radar apparatus according to an embodiment.

FIG. 2 is a block diagram showing an exemplary functional configuration of the preceding stage receiving unit shown in FIG. 1.

FIG. 5 is a block diagram showing another exemplary functional configuration of the preceding stage receiving unit shown in FIG. 1.

FIG. 6 is a block diagram showing another exemplary functional configuration of the preceding stage receiving unit shown in FIG. 1.

DETAILED DESCRIPTION

Figure 3:
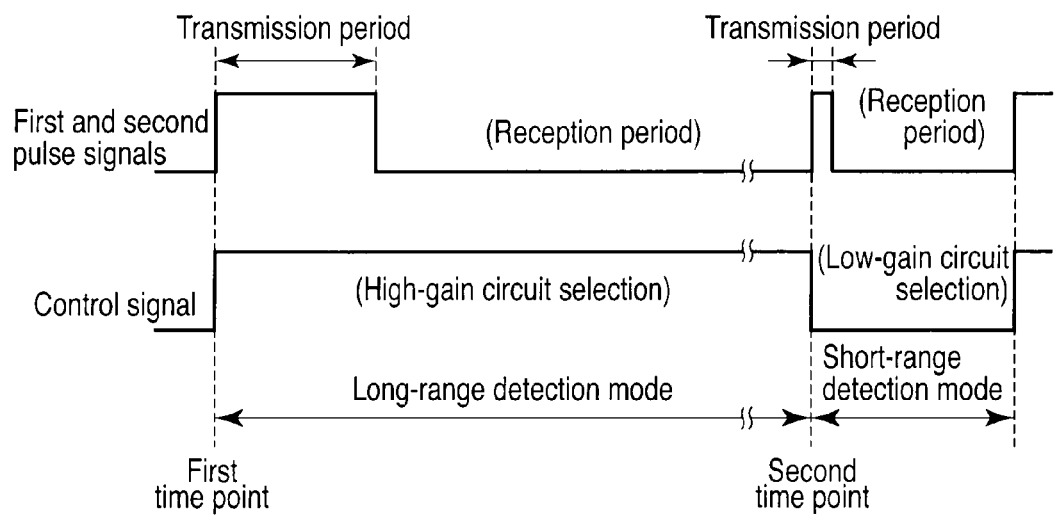
FIG. 3 shows timing chart for generating a first or second pulse signal and for switching a state of a control signal in the signal processor shown in FIG. 1.

In general, according to one embodiment, an radar apparatus for detecting a target with utilizing a long-range detection mode and a short-range detection mode, includes a signal processor, a transmitting unit, an antenna, a first receiving unit, and a second receiving unit. The signal processor generates a first pulse at a first time point in the long-range detection mode and a second pulse at a second time point in the short-range detection mode, and generates a control signal having first and second states which are switched from each other at the first and second time points, respectively, and set the long-range detection mode during a first time period starting from the first time and the short-range detection mode during a second time period starting from the second time. The transmitting unit converts the first and second pulses from the signal processor into first and second transmission pulses. The antenna radiates the first and second transmission pulses from the transmitting unit to a space and receives reflection pulses reflected from the target to generate a reception signal. The first receiving unit includes first and second receiving circuits which processes the reception signal to generate first and second processed signals, respectively, wherein a power level of the first processed signal is larger than a power level of the second processed signal, the first and second receiving circuits are allowed to output one of the first and second processed signals depending on one of the first and second states of the control signal. The second receiving unit performs receiving processing on the one of the first and second processed signals from the first receiving unit.

[First Embodiment]

Referring to the drawings, an embodiment of a radar apparatus will be described.

FIG. 1 is a block diagram showing a functional configuration of the radar apparatus according to the embodiment. The radar apparatus in FIG. 1 comprises a signal processor 10, a transmitting device 20, a circulator 30, a antenna 40 and a receiving device 50.

The signal processor 10 performs switching between a long-range detection mode and a short-range detection mode at predetermined times. The long-range detection mode is for a long-range detection of a target. The short-range detection is for a short-range detection of the target. The signal processor 10 generates a first pulse signal at a first time point in the long-range detection mode, and generates a second pulse signal at a second time point in the short-range detection mode. The pulse width of the first pulse signal is different from that of the second pulse signal. The signal processor 10 outputs the first or second pulse signal to the transmitting device 20.

The signal processor 10 also generates a control signal having first and second states. The signal processor 10 switches a state of the control signal at the first and second time point. For example, when the signal processor 10 switches the state of the control signal from the second state to the first state at the first time point, and switches the state from the first state to the second state at the second time. The signal processor 10 outputs the control signal to the receiving device 50. The first state indicates the receiving device 50 that the radar apparatus is in the long-range detection mode during a first time period starting from the first time. The second state indicates the receiving device 50 that the radar apparatus is in the short-range detection mode during a second time period starting from the second time.

The signal processor 10 receives a reception pulse signal from the receiving device 50. The signal processor 10 calculates, for example, a power level and phase of the reception pulse signal. Based on the calculation result, the signal processor 10 analyzes, for example, a position and direction of travel of, for example, an airplane flying in the sky.

The transmitting device 20 comprises, for example, a mixer, a high-frequency amplifier and a filter, and performs high-frequency processing on the first and second pulse signal from the signal processor 10. The transmitting device 20 converts the first and second pulses into first and second transmission pulses, respectively. The transmitting device 20 radiates the first and second transmission pulse signal subjected to the high-frequency processing to a space from the antenna 40 via the circulator 30.

The first or second transmission pulse signal is reflected from the target and returns to the radar apparatus as a reflected pulse signal. The antenna 40 receives the reflected pulse signal to generate a reception pulse signal. The reception pulse signal is supplied to the receiving device 50 via the circulator 30.

The receiving device 50 comprises a preceding stage receiving unit 51 and a subsequent stage receiving unit 52. FIG. 2 is a block diagram showing a functional configuration of the preceding stage receiving unit 51 of the radar apparatus of the embodiment.

The preceding stage receiving unit 51 in FIG. 2 comprises a directional coupler 511, a high-gain circuit 512, a low-gain circuit 513, and a switch 514.

The directional coupler 511 divides the reception pulse signal inputted via the circulator 30 into two signals, i.e., first and second divided signals. The directional coupler 511 outputs first and second divided signals to the high-gain circuit 512 and low-gain circuit 513, respectively, in such a manner that the power level of the second divided signal is lower than the power level of the first divided signal by approximately 20 dB.

The high-gain circuit 512 comprises an amplifier 5121 and an attenuator (ATT) 5122. The amplifier 5121 subjects the first divided signal from the directional coupler 511 to a predetermined gain, and outputs the amplified signal to the attenuator 5122. The attenuator 5122 attenuates a signal revel of the amplified signal partly for adjustment of the amplification. Thus the attenuator 5122 stabilizes the output of amplifier 5121. The attenuator 5122 outputs a first processed signal to the switch 514.

The low-gain circuit 513 comprises attenuator 5131, amplifier 5132 and attenuator 5133. Attenuator 5131 attenuates the second divided signal from the directional coupler 511, and outputs the attenuated signal to amplifier 5132. Amplifier 5132 subjects the signal from attenuator 5131 to the same gain as that of amplifier 5121, and outputs the amplified signal to attenuator 5133. In this embodiment, the gain of amplifier 5121 and the gain of amplifier 5132 are made the same to simplify the design of the apparatus, but this is not essential. Attenuator 5133 stabilizes the output of amplifier 5132, attenuates the signal level partly for adjustment of the amplification, and outputs a second processed signal to the switch 514.

Upon receipt of the control signal from the signal processor 10, the switch 514 switches connection so as to output the first processed signal from the high-gain circuit 512 or the second processed signal from the low-gain circuit 513 to the subsequent stage receiving unit 52. Namely, when the switch 514 receives the control signal in the first state, the switch 514 switches connection so as to output the first processed signal to the subsequent stage receiving unit 52. When the switch 514 receives the control signal in the second state, the switch 514 switches connection so as to output the second processed signal to the subsequent stage receiving unit 52.

The subsequent stage receiving unit 52 comprises, for example, a mixer, an amplifier, a filter and an analog-to-digital converter, and receives and processes the first or second processed signal from the preceding stage receiving unit 51. The subsequent stage receiving unit 52 outputs the received and processed signal to the signal processor 10.

Next, operations in the above configuration will be described.

FIG. 3 shows timing chart for generating the first or second pulse signal and for switching the state of the control signal in the signal processor 10. The timing chart in FIG. 3 can be broadly divided into two periods, i.e., the second time period for the short-range mode and the first time period for the long-range mode. Each period includes a reception period for receiving a reflected pulse signal after outputting the first or second transmission pulse signal. The signal processor 10 handles the first and second time periods as a series of operations, and repeats the operations.

The radar apparatus is not capable of effective reception during a period in which the first or second transmission pulse signal is radiated. Namely, detection of a short-range area is not possible during a period in which a long pulse having large energy for long-range detection is transmitted. In the radar apparatus of this embodiment, times when the transmission pulse signal is generated are set so that the short-range area is covered by detection performed by transmitting and receiving a short pulse.

At the same time as generating the first pulse signal, the signal processor 10 switches the state of the control signal from the second state to the first state, and outputs the control signal in the first state to the receiving device 50. Accordingly, at the same time generating the first pulse signal, the switch 514 switches connection to the high-gain circuit 512. At the same time as generating the second pulse signal, the signal processor 10 switches the state of the control signal from the first state to the second state, and outputs the control signal in the second state to the receiving device 50. Accordingly, at the same time generating the second pulse signal, the switch 514 switches connection to the low-gain circuit 513.

As described above, in the above embodiment, the preceding stage receiving unit 51 outputs the second processed signal to the subsequent stage receiving unit 52 via the low-gain circuit 513 when the radar apparatus performs short-range detection. Accordingly, the reception signal with a relatively high power level in short-range detection is subjected to low gain, and an excessively strong reception signal can be prevented from being output to the subsequent stage receiving unit 52.

When the radar apparatus performs long-range detection, the preceding stage receiving unit 51 outputs the first processed signal to the subsequent stage receiving unit 52 via the high-gain circuit 512. With this configuration, the reception signal at a low power level in long-range detection can be amplified to a level detectable for the signal processor 10.

Accordingly, the radar apparatus can perform short-range detection and long-range detection by selecting the high-gain circuit 512 and the low-gain circuit 513 as an emission path of the reception signal at predetermined times for switching the detection mode. Namely, the radar apparatus can provide the receiving device 50 with a wider dynamic range.

In the above embodiment, the receiving device 50 absorbs the power level difference between the reception signals received during the period of short-range detection and received during the period of long-range detection at the directional coupler 511, high-gain circuit 512 and low-gain circuit 513 in the preceding stage receiving unit 51. Therefore, the receiving device 50 can receive and process the reception signal received during the period of short-range detection and the reception signal received during the period of long-range detection at a single subsequent stage receiving unit 52.

Consequently, the radar apparatus according to the present embodiment can perform short-range detection and long-range detection, and can realize miniatulization, simplification and cost-cutting of the entire radar apparatus.

The preceding stage receiving unit 51 according to the present embodiment does not necessarily have the configuration shown in FIG. 2. As long as the gain of the reception signal in the short-range detection mode differs from the gain of the reception signal in the long-range detection mode, the preceding stage receiving unit 51 may not necessarily have the configuration shown in FIG. 2. For example, the preceding stage receiving unit may have the configurations shown in FIGS. 4-6.

Figure 4:
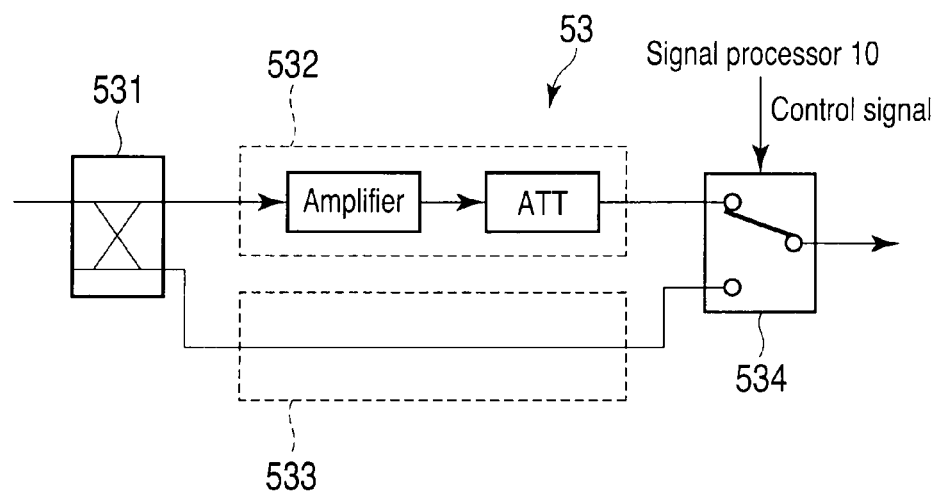
FIG. 4 is a block diagram showing another exemplary functional configuration of the preceding stage receiving unit shown in FIG. 1.

The preceding stage receiving unit 53 in FIG. 4 comprises a directional coupler 531, a high-gain circuit 532, a low-gain circuit 533 and a switch 534. The directional coupler 531 divides a reception signal into two signals, i.e., first and second divided signals. The power level of the second divided signal is lower than the power level of the first divided signal. The directional coupler 531 outputs the first divided signal having a higher power level to the high-gain circuit 532, and outputs the second divided signal having a lower power level to the low-gain circuit 533. The high-gain circuit 532 comprises an amplifier and an attenuator, subjects the first divided signal to high gain and outputs a first processed signal to the switch 534. The low-gain circuit 533 includes a connection line, and outputs the second divided signal obtained by division at the directional coupler 531 to the switch 534 as a second processed signal. In accordance with the control signal from the signal processor 10, the switch 534 outputs the first or second processed signal to the subsequent stage receiving unit 52. Namely, in accordance with the control signal in the second state from the signal processor 10, the switch 534 outputs the second processed signal to the subsequent stage receiving unit 52 during the period of short-range detection. In accordance with the control signal in the first state from the signal processor 10, the switch 534 outputs the first processed signal to the subsequent stage receiving unit 52 during the period of long-range detection.

The preceding stage receiving unit 54 in FIG. 5 comprises a directional coupler 541, a high-gain circuit 542, a low-gain circuit 543 and a switch 544. The directional coupler 541 divides a reception signal into two signals, i.e., first and second divided signals. The power level of the second divided signal is lower than the power level of the first divided signal. The directional coupler 541 outputs the first divided signal having a higher power level to the high-gain circuit 542, and the second divided signal having a lower power level to the low-gain circuit 543. The high-gain circuit 542 and low-gain circuit 543 each include a connection line, and output the first and second divided signal to the switch 544 as first and second processed signals, respectively. In accordance with the control signal from the signal processor 10, the switch 544 outputs the first or second processed signal to the subsequent stage receiving unit 52. Namely, in accordance with the control signal in the second state from the signal processor 10, the switch 544 outputs the second processed signal to the subsequent stage receiving unit 52 during the period of short-range detection. In accordance with the control signal in the first state from the signal processor 10, the switch 544 outputs the first processed signal to the subsequent stage receiving unit 52 during the period of long-range detection.

The preceding stage receiving unit 55 in FIG. 6 comprises a switch 551, a high-gain circuit 552 and a low-gain circuit 553. In accordance with the control signal in the second state from the signal processor 10, the switch 551 outputs the reception signal to the low-gain circuit 553 during the period of short-range detection. In accordance with the control signal in the first state from the signal processor 10, the switch 551 outputs the reception signal to the high-gain circuit 552 during the period of long-range detection. The high-gain circuit 552 comprises an amplifier and an attenuator, subjects the reception signal from the switch 551 to high gain, and outputs a first processed signal to the subsequent stage receiving unit 52. The low-gain circuit 553 comprises an amplifier and attenuators, subjects the reception signal from the switch 551 to a lower gain than that of the high-gain circuit 552, and outputs a second processed signal to the subsequent stage receiving unit 52.

Figure 7:
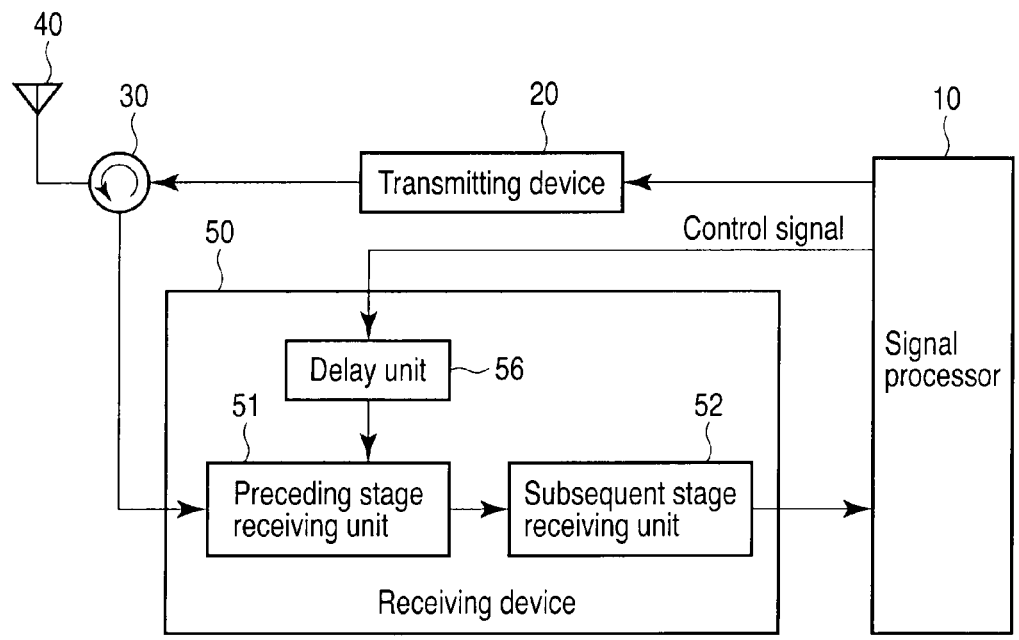
FIG. 7 is a block diagram showing another exemplary functional configuration of the radar apparatus shown in FIG. 1.
Figure 8:
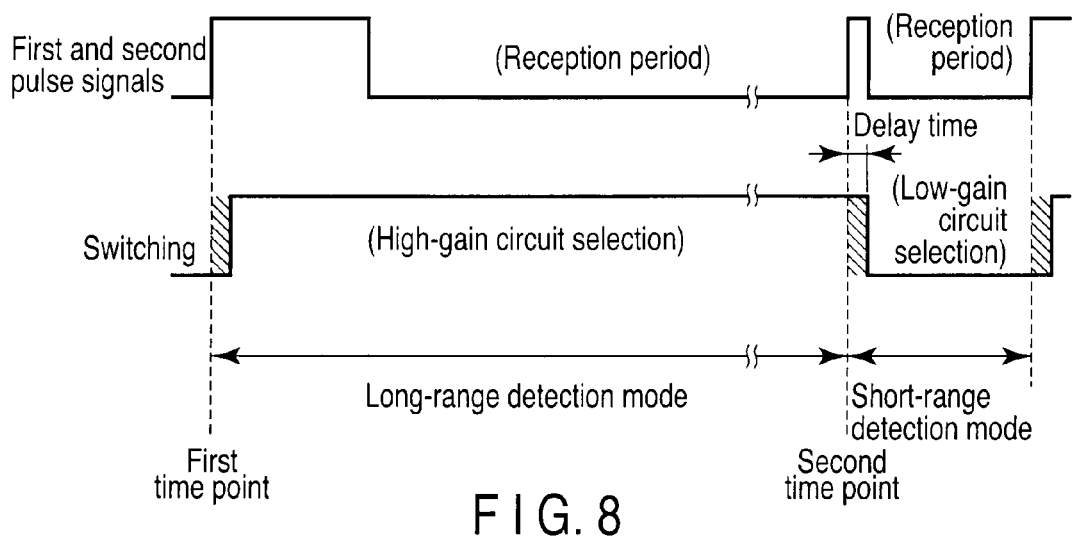
FIG. 8 shows timing chart for generating a first or second pulse signal by the signal processor shown in FIG. 7 and for switching connection by the switch in the preceding stage receiving unit shown in FIG. 7.

The above embodiment has been described using an exemplary case in which the radar apparatus has the configuration shown in FIG. 1. However, the radar apparatus may have the configuration shown in FIG. 7. The receiving device 50 in FIG. 7 further comprises a delay unit 56. The delay unit 56 gives a predetermined delay to the control signal output to the switch 514. The delay time is set to adjust times for switching in accordance with the environmental conditions under which the radar apparatus operates and the performance of the radar apparatus. FIG. 8 shows timing chart for generating the first or second pulse signal by the signal processor 10 and for switching connection by the switch in the preceding stage receiving unit 51. The delay unit 56 enables adjustment of times when the control signal output from the signal processor 10 reaches the switch 514. Namely, the delay unit 56 enables adjustment of times when the switch 514 switches connection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar apparatus for detecting a target by utilizing a long-range detection mode and a short-range detection mode, the radar apparatus comprising:
   a signal processor configured to generate a first pulse utilized for the long-range detection mode at a first time point and a first control signal simultaneously by generation of the first pulse to change the short-range detection mode to the long-range detection mode, and to generate a second pulse utilized for the short-range detection mode at a second time point and a second control signal simultaneously by generation of the second pulse to change the long-range detection mode to the short-range detection mode, the width of the first pulse greater than the width of the second pulse;
   a transmitting unit which converts the first and second pulses from the signal processor into first and second transmission pulses;
   an antenna which radiates the first and second transmission pulses from the transmitting unit and receives reflection pulses reflected from the target to generate a reception signal;
   a first receiving unit including first and second receiving circuits, the first receiving circuit configured to generate a first processed signal based on the reception signal and output the generated first processed signal during a period starting when the first receiving unit receives the first control signal output from the signal processor and ending when the first receiving unit receives the second control signal output from the signal processor, the second receiving circuit configured to generate a second processed signal based on the reception signal and output the generated second processed signal during a period starting when the first receiving unit receives the second control signal and ending when the first receiving unit receives the first control signal, a power level of the first processed signal being higher than a power level of the second processed signal; and
   a second receiving unit which performs receiving processing on the one of the first and second processed signals from the first receiving unit.

2. The radar apparatus of claim 1, wherein the first receiving unit further includes:
   a directional coupler which divides the reception signal from the antenna into first and second divided signals, and supplies the first and second divided signals to the first and second receiving circuit, respectively, wherein the first and second receiving circuits process the first and second divided signals to generate first and second processed signals, respectively, the directional coupler divides the reception signal in such a manner that a power level of the first divided signal is higher than a power level of the second divided signal, and
   a switch which outputs the second processed signal generated by the second receiving circuit to the second receiving unit during a period starting when the switch receives the second control signal and ending when the switch receives the first control signal, and outputs the first processed signal generated by the first receiving circuit to the second receiving unit during a period starting when the switch receives the first control signal and ending when the switch receives the second control signal.

3. The radar apparatus of claim 2, wherein
the first receiving circuit further includes a first amplifier which subjects the first divided signal from the directional coupler to a first gain, and
the second receiving circuit further includes a second amplifier which subjects the second divided signal from the directional coupler to a second gain lower than the first gain.

4. The radar apparatus of claim 2, wherein
the first receiving circuit further includes an amplifier which subjects the first divided signal from the directional coupler to a first gain, and
the second receiving circuit further includes a connection line which connects the directional coupler to the switch.

5. The radar apparatus of claim 2, wherein
the first receiving circuit further includes a first connection line which connects the directional coupler to the switch, and
the second receiving circuit further includes a second connection line which connects the directional coupler to the switch.

6. The radar apparatus of claim 1, wherein
the first receiving unit further includes a switch which outputs the reception signal from the antenna to the second receiving circuit during a period starting when the switch receives the second control signal and ending when the switch receives the first control signal, and outputs the reception signal from the antenna to the first receiving circuit during a period starting when the switch receives the first control signal and ending when the switch receives the second control signal.

7. The radar apparatus of claim 6, wherein
the first receiving circuit further includes a first amplifier which subjects the reception signal from the switch to a first gain; and
the second receiving circuit further includes a second amplifier which subjects the reception signal from the switch to a second gain lower than the first gain.

8. The radar apparatus of claim 6, wherein
the first receiving circuit further includes an amplifier which subjects the reception signal from the switch to a first gain; and
the second receiving circuit further includes a transmission line which transmits the reception signal from the switch to the second receiving unit.

9. The radar apparatus of claim 1, further comprising:
a delay unit which supplies the first receiving unit with the first or second control signal from the signal processor by delaying the first or second control signal by a predetermined delay time.

* * * * *